(12) United States Patent
Colban et al.

(10) Patent No.: US 8,934,327 B2
(45) Date of Patent: Jan. 13, 2015

(54) MBS WITH OUTER CODING AND ADJUSTED FRAME REFERENCE

(75) Inventors: Erik Colban, San Diego, CA (US); Dennis Connors, San Diego, CA (US); Yoav Nebat, San Diego, CA (US); Kenneth Stanwood, San Diego, CA (US); Sina Zahedi, San Diego, CA (US)

(73) Assignee: Wi-LAN, Inc., Ottawa, ON (CA)

( * ) Notice: Subject to any disclaimer, the term of this patent is extended or adjusted under 35 U.S.C. 154(b) by 849 days.

(21) Appl. No.: 13/061,648

(22) PCT Filed: Sep. 3, 2009

(86) PCT No.: PCT/US2009/055916
§ 371 (c)(1),
(2), (4) Date: Oct. 27, 2011

(87) PCT Pub. No.: WO2010/028167
PCT Pub. Date: Mar. 11, 2010

(65) Prior Publication Data
US 2012/0033598 A1    Feb. 9, 2012

Related U.S. Application Data

(60) Provisional application No. 61/094,027, filed on Sep. 3, 2008.

(51) Int. Cl.
*H04L 9/00* (2006.01)
*H04L 1/00* (2006.01)
*H04W 28/04* (2009.01)

(52) U.S. Cl.
CPC ............ *H04L 1/0083* (2013.01); *H04L 1/0025* (2013.01); *H04L 1/0028* (2013.01); *H04L 1/0065* (2013.01); *H04L 1/0003* (2013.01); *H04L 1/0009* (2013.01); *H04W 28/04* (2013.01)
USPC ............................ 370/204; 370/278; 370/328

(58) Field of Classification Search
CPC ... H04L 1/0065; H04L 1/0057; H04L 1/0071; H03M 13/2936; H04N 21/2383
See application file for complete search history.

(56) References Cited

U.S. PATENT DOCUMENTS

| | | | |
|---|---|---|---|
| 7,688,902 B1 * | 3/2010 | Lou et al. ...................... | 375/260 |
| 2005/0169205 A1 | 8/2005 | Grilli et al. | |
| 2005/0193309 A1 * | 9/2005 | Grilli et al. ..................... | 714/752 |
| 2007/0177627 A1 * | 8/2007 | Raju et al. ..................... | 370/469 |
| 2007/0177631 A1 | 8/2007 | Popovic et al. | |
| 2007/0253367 A1 * | 11/2007 | Dang et al. .................... | 370/329 |

(Continued)

OTHER PUBLICATIONS

LAN/MAN Standards Committee of the IEEE Computer Society and the IEEE Microwave Theory and Techniques Society, "DRAFT Standard for Local and metropolitan area networks, Part 16: Air Interface for Broadband Wireless Access Systems," P802.16Rev2/D5 (Jun. 2008).

*Primary Examiner* — Jung Park
(74) *Attorney, Agent, or Firm* — Volpe and Koenig, P.C.

(57) ABSTRACT

The subject matter disclosed herein provides methods and apparatus for providing MBS (multicast broadcast service) with outer coding and adjusted frame reference indexing. In one aspect, there is provided a method. The method includes receiving data packets from a network, dividing the data packets into one or more data streams, applying outer encoding on the one or more data streams and providing the one or more encoded data streams to an air interface for transmission to a user equipment over a wireless communication system.

18 Claims, 6 Drawing Sheets

(56) References Cited

U.S. PATENT DOCUMENTS

| | | |
|---|---|---|
| 2007/0268933 A1 | 11/2007 | Wu et al. |
| 2008/0080474 A1 | 4/2008 | Kitchin |
| 2008/0186935 A1* | 8/2008 | Ling et al. .............. 370/342 |
| 2009/0147877 A1* | 6/2009 | Connors et al. .......... 375/267 |

* cited by examiner

MBS WITH OUTER CODING AND ADJUSTED FRAME REFERENCE

CROSS-REFERENCE TO RELATED APPLICATION

This application is a national stage application of PCT Application No. PCT/US2009/055916, filed Sep. 3, 2009, which claims the benefit of U.S. Provisional Application No. 61/094,027, filed Sep. 3, 2008. All of the above referenced applications are hereby incorporated by reference herein.

TECHNICAL FIELD

This disclosure relates to communication systems, and more particularly to a method and apparatus providing MBS (multicast broadcast service) with outer coding and adjusted frame reference indexing.

BACKGROUND

In wireless transmission procedures, including the delivery of MBS, it is necessary to reference a particular MAC (Media Access Control) frame. For instance, a BS (Base Station) may signal to an UE (User Equipment) in what frame it expects to receive a particular message, or in what frame it must send a particular message, or in what frame it must invoke a particular behavior. Currently, in 802.16 (and LTE) networks, two methods are used for referencing a frame. In the first method, the BS includes in its message an absolute frame number to refer to a frame where the specific activity needs to take place. In the second method, the desired frame is indicated by the BS using a frame offset with respect to the current frame.

Using absolute frame numbers has shortcoming. For example, conventional base stations in a network may not synchronize their frame numbering. That is, when one BS transmits a frame numbered M1, a neighboring BS may be transmitting a frame numbered M2. Therefore, absolute frame numbers can only be used when the BS with respect to which the reference is given is known to the UE (a fixed, nomadic or mobile station). This is not always the case. Some examples include the following: (1) when the UE exits Idle Mode; (2) when the UE is listening to pages or broadcast announcements; and (3) when the UE is receiving an allocation at a target BS and there are several potential target BSs (as is the case in, for example, macro-diversity reception from multiple BSs).

Use of the frame offset method also has short comings. For example, the message that contains the frame offset needs to be received in a particular frame. This imposes constraints on the BS scheduler, which needs to ensure that the message is transmitted and received in a particular frame, as delaying transmission would result in the offset information being invalid. Furthermore, if the message is fragmented, or if the message requires multiple HARQ or ARQ retransmissions, the receiver must be able to determine when the first fragment or HARQ/ARQ transmission occurred, which complicates the implementation of the receiver.

Current wireless systems also incorporate modes to deliver Multicast and Broadcast Services (MBS) data. For example, IEEE802.16 and LTE support MBS (LTE uses the term MBMS (Multimedia Broadcast/Multicast Service)). A shortcoming of present schemes is that to achieve PER (Packet Error Rates) that are required for broadcast or multicast video and audio applications and data-casting, a wireless network must typically use overly robust and inefficient MCS (Modulation and Coding Schemes) or must somehow employ a retransmission scheme more suited to file transfer than for real time consumption of a Multicast or Broadcast Service.

SUMMARY

The subject matter disclosed herein provides methods and apparatus for wireless communications and, more particularly, MBS (multicast broadcast service) with outer coding and adjusted frame reference indexing.

In an exemplary embodiment of the present disclosure, there is a method. The method includes receiving data packets from a network, dividing the data packets into one or more data streams, applying outer encoding on the one or more data streams and providing the one or more encoded data streams to an air interface for transmission to a user equipment over a wireless communication system.

In yet another exemplary embodiment, there is a user equipment. The user equipment including a receiving unit configured to receive one or more encoded data streams from a base station and a processor coupled to the receivers and configured to apply outer decoding on the one or more encoded data streams and provide the decoded data streams to a user equipment application.

In still another exemplary embodiment, there is an apparatus. The apparatus including a controller for dividing data packets into one or more streams, applying outer encoding on the one or more streams and determining the scheduling details including MCS for simultaneous transmission of data streams by one or more base stations and a transmitter for transmitting the encoded data streams to a user equipment.

The details of one or more variations of the subject matter described herein are set forth in the accompanying drawings and the description below. Features and advantages of the subject matter described herein will be apparent from the description and drawings, and from the claims.

Figure 1:
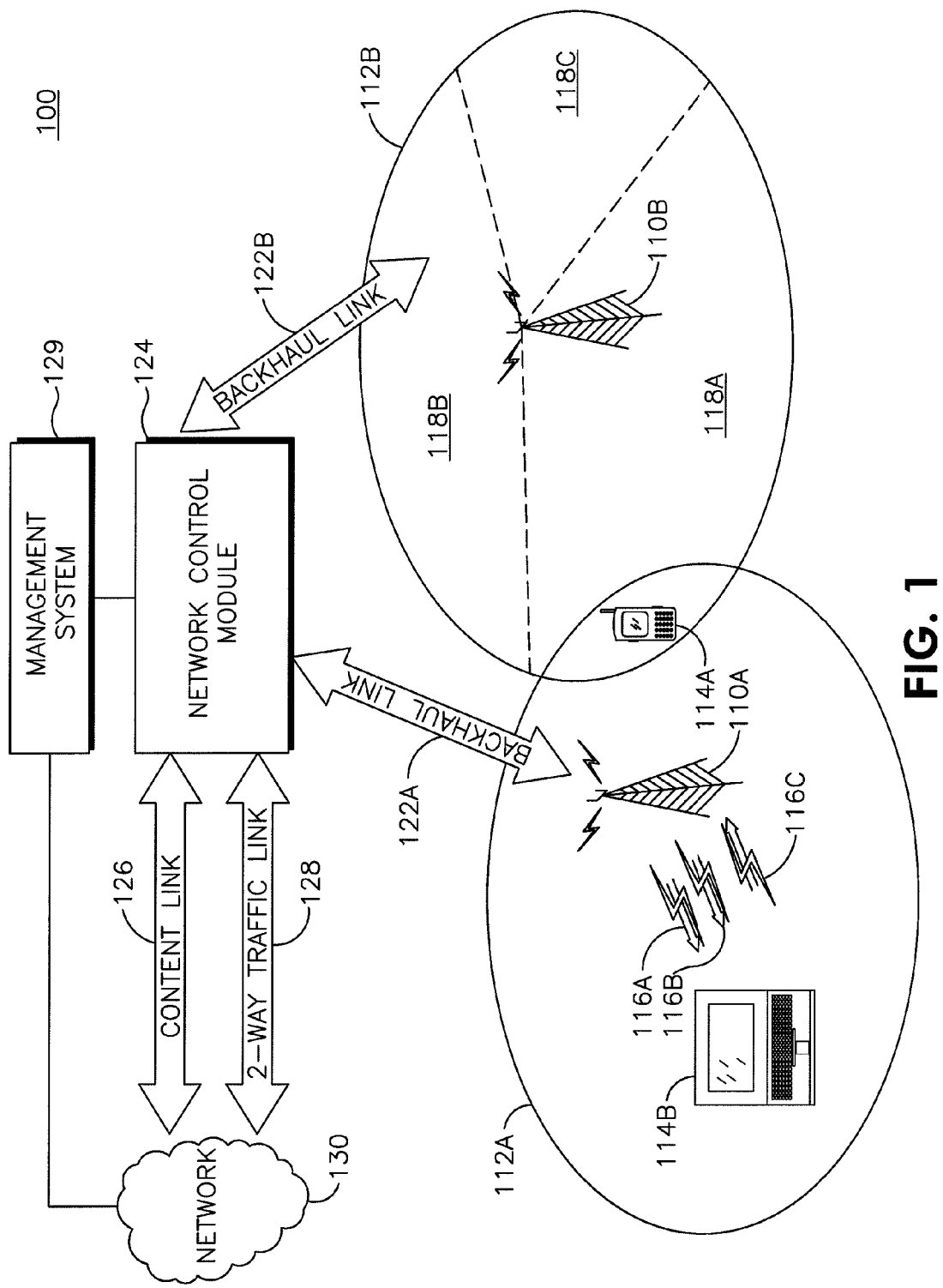
FIG. 1 depicts a block diagram of a network including Base Stations and User Equipments.

Like labels are used to refer to same or similar items in the drawings.

DETAILED DESCRIPTION

FIG. 1 depicts a simplified functional block diagram of an embodiment of a wireless communication system 100. The wireless communication system 100 includes a plurality of base stations 110A and 110B, each supporting a corresponding service or coverage area 112A and 112B. The base stations are capable of communicating with wireless devices within their coverage areas. For example, the first base station 110A is capable of wirelessly communicating with a first UE 114A and a second UE 114B within the coverage area 112A. The first UE 114A is also within the coverage area 112B (Sector 118A) and is capable of communicating with the second base station 110B. In this description, the communication path from the base station to the UE is referred to as a downlink 116A and 116B and the communication path from the UE to the base station is referred to as an uplink 116C.

Although for simplicity only two base stations are shown in FIG. 1, a typical wireless communication system 100 includes a much larger number of base stations. The base stations 110A and 110B can be configured as cellular base station transceiver subsystems, gateways, access points, radio frequency (RF) repeaters, frame repeaters, nodes, or any wireless network entry point. The base stations 110A and 110B can be configured to support either an omnidirectional coverage area or a sectored coverage area. For example, in FIG. 1 the second base station 110B is depicted as supporting the sectored coverage area 112B. The coverage area 112B is depicted as having three sectors, 118A, 118B, and 118C. In typical embodiments, the second base station 110B treats each sector 118A, B, C as effectively a distinct coverage area.

Although only two User Equipments 114A and 114B are shown in the wireless communication system 100, typical systems are configured to support a large number of User Equipments. The User Equipment 114A and 114B can be mobile, nomadic, or stationary units. The User Equipment 114A and 114B are often referred using alternative terminology, for example, client stations, mobile stations, mobile units, subscriber stations, wireless terminals, or the like; in this specification the term UE encompasses all these definitions. A User Equipment can be, for example, a wireless handheld device, a vehicle mounted device, a portable device, user or subscriber premise equipment, a fixed location device, a wireless plug-in accessory or the like. In some cases, a User Equipment can take the form of a handheld computer, notebook computer, wireless telephone, personal digital assistant, wireless email device, personal media player, meter reading equipment or the like and may include a display mechanism, microphone, speaker and memory.

In a typical system, the base stations 110A and 110B communicate with each other using a Network Control Module 124 over backhaul links 122A and 122B and in some embodiments the base stations 110A and 110B may also communicate directly with each other. The backhaul links 122A and 122B may include wired and wireless communication links. The network control module 124 provides network administration and coordination as well as other overhead, coupling, and supervisory functions including, in some embodiments, such functions as the allocation of resources and base station (e.g. BS 110A, B) radio configuration in the wireless communication system 100.

In some embodiments, the wireless communication system 100 can be configured to support both bidirectional communication and unidirectional communication. In a bidirectional network, the UE is capable of both receiving information from and providing information to the wireless communications network. Applications operating over the bidirectional communications channel include traditional voice and data applications. In a unidirectional network, the UE is capable of receiving information from the wireless communications network but may have limited or no ability to provide information to the network. Applications operating over the unidirectional communications channel include broadcast and multicast applications. In one embodiment, the wireless system 100 supports both bidirectional and unidirectional communications. In such an embodiment, the network control module 124 also acts as a gateway; it may be coupled to external entities via, for example, a content link 126 (e.g., a source of digital video and/or multimedia) and a two-way traffic link 128 which in turn are connected to a network 130.

A typical system incorporates a Management System 129 whereby the system parameters can be set and performance monitored and may be used to set parameters corresponding to data on the content link 126 and two-way traffic link 128. The wireless communication system 100 can be configured (through a Network Management System 129). Typically systems used to distribute multicast and broadcast that rely on the use of Stream Identification and transmission areas are split into different zones each covering a defined geographic area, for MBS operation. Such zones, known as MBS Zones in IEEE802.16 (or the equivalent concept in LTE known as MBMS Zones), can be implemented with different streams being transmitted in different zones. Each MBS Zone has a MBS Zone ID through which it can be identified. Typically zones are set by the network operator, being configured according to the needs of the network operators and users of the network; MBS Zone ID may be set by the Network Control Module 124. Data, such as streaming data, can be marked either in the Network Control Module 124 or elsewhere in the Network 130 with a Stream Identification Code (Stream ID) to enable a stream within a given zone to be uniquely identified by receiving apparatus (e.g. UE 114B).

The wireless communication system 100 can be configured to use Orthogonal Frequency Division Multiple Access (OFDMA) communication techniques. For example, the wireless communication system 100 can be configured to substantially comply with a standard system specification, such as IEEE 802.16 and its progeny or some other wireless standard such as, for example, WiBro, WiFi, Third Generation Partnership Project (3GPP) Long Term Evolution (LTE), or it may be a proprietary system. The wireless system may be operated in Frequency Division Duplex Mode (FDD) or Time Division Mode (TDD) or Hybrid FDD/TDD mode or Downlink Only Mode in paired or unpaired spectrum as appropriate. In some embodiments a two-way mode of operation may be complemented by a one-way (downlink only) mode which may be used for MBS and traditional Broadcast.

Those skilled in the art will appreciate that in a practical embodiment all or part of the Network Control Module 124 may be integrated into the Base Station 110 or split into two or more modules performing the functions described herein. Alternatively one or more functions described as being within the scope of the BS (110A) may be distributed to a centralised module such as the Network Control Module (124). Furthermore, other network entities not depicted or described herein but known to those skilled in the art, may be required to implement a practical wireless communication system.

The subject matter described herein is not limited to application to OFDMA systems or to the noted standards and specifications. The description in the context of an OFDMA system is offered for the purposes of providing a particular example only.

As used herein, IEEE 802.16 refers to one or more Institute of Electrical and Electronic Engineers (IEEE) Standard for Local and metropolitan area networks, Part 16: Air Interface for Fixed Broadband Wireless Access Systems, 1 Oct. 2004, IEEE Standard for Local and metropolitan area networks, Part 16: Air Interface for Fixed and Mobile Broadband Wireless Access Systems, 26 Feb. 2006, and any subsequent additions or revisions to the IEEE 802.16 series of standards. As used herein, LTE refers to the Long Term Evolution for UMTS being developed by the Third Generation Partnership Project (3GPP) and any subsequent revisions In some embodiments, downlinks 116A and 116B and uplink 116C each represent a radio frequency (RF) signal.

The RF signal may include data, such as voice, video, images, Internet Protocol (IP) packets, control information, and any other type of information. When IEEE-802.16 or LTE is used, the RF signal may use OFDMA. OFDMA is a multi-user version of orthogonal frequency division multiplexing (OFDM). In OFDMA, multiple access is achieved by assigning to individual users, groups of (subcarrier, timeslot) pairs. The subcarriers are modulated using one or more of the following techniques: BPSK (binary phase shift keying), QPSK (quadrature phase shift keying), QAM (quadrature amplitude modulation), and carry symbols (also referred to as OFDMA symbols) and typically includes data coded using FEC (forward error-correction code) or both inner and outer FEC.

Figure 2:
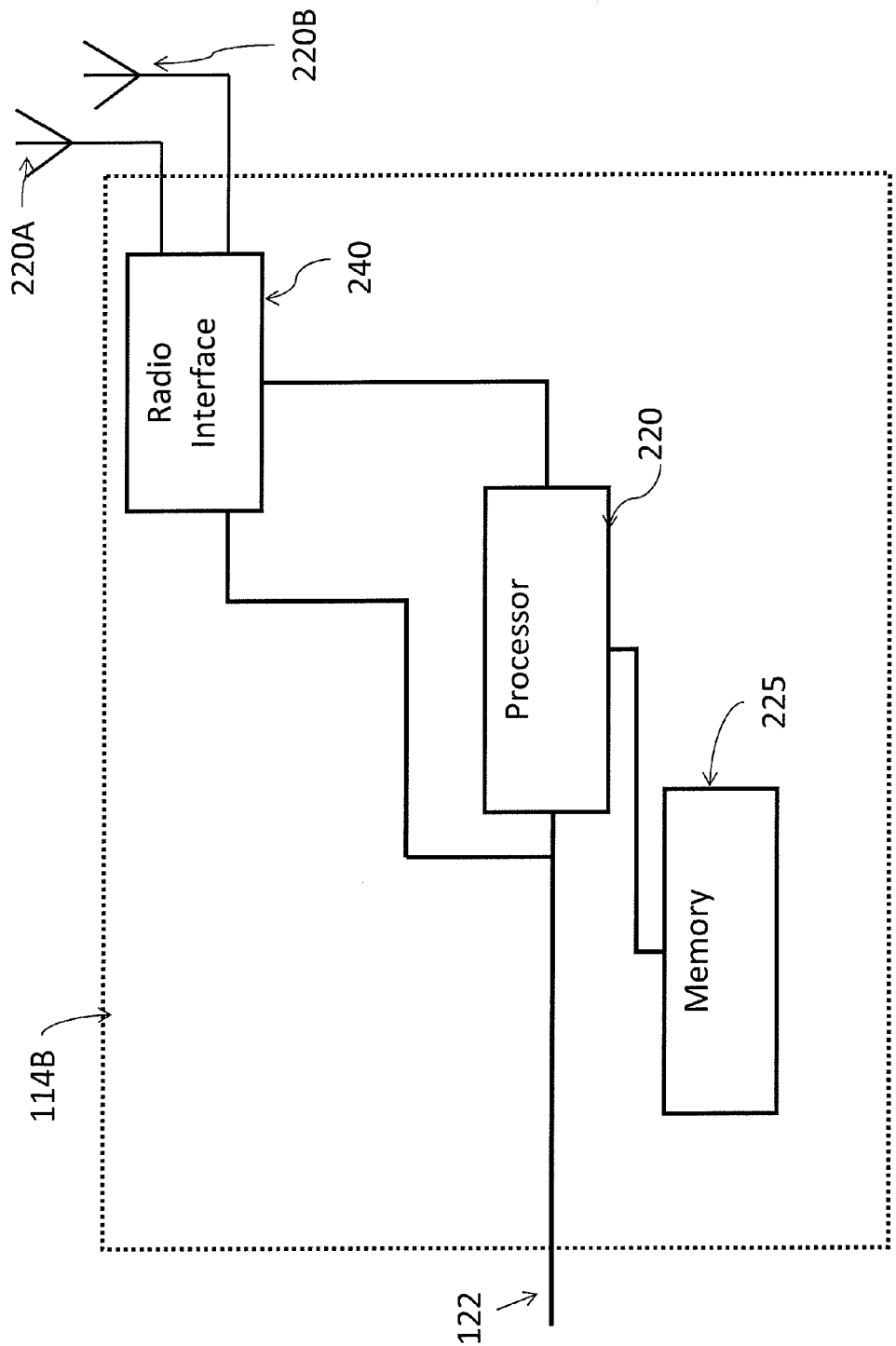
FIG. 2 depicts a block diagram of a User Equipment.

FIG. 2 depicts an exemplary UE (User Equipment), which may be part of a handheld, portable or fixed station. The UE 114B includes a one or more antennas 220A-B for receiving the downlinks 116A-B. The UE 114B also includes a radio interface 240, which may include other components, such as filters, converters (e.g., digital-to-analog converters and the like), symbol de-mappers, an Inverse Fast Fourier Transform (IFFT) module, and the like, to process symbols, such as OFDMA symbols, carried by downlinks 116A-B. The UE 114B includes means for implementing a CS to interface between the radio MAC layer and the function necessary for decoding the outer-coded application data and processing the Application Data Streams. In some implementations, the UE 114B is also compatible with IEEE 802.16 and OFDMA. The UE 114B further includes a processor 220 for controlling said UE 114B and for accessing and executing program code stored in memory 225.

Those skilled in the art will recognise in a realisation of a practical UE some of these functional elements need not be physically separate and could be combined into a single module.

Figure 3:
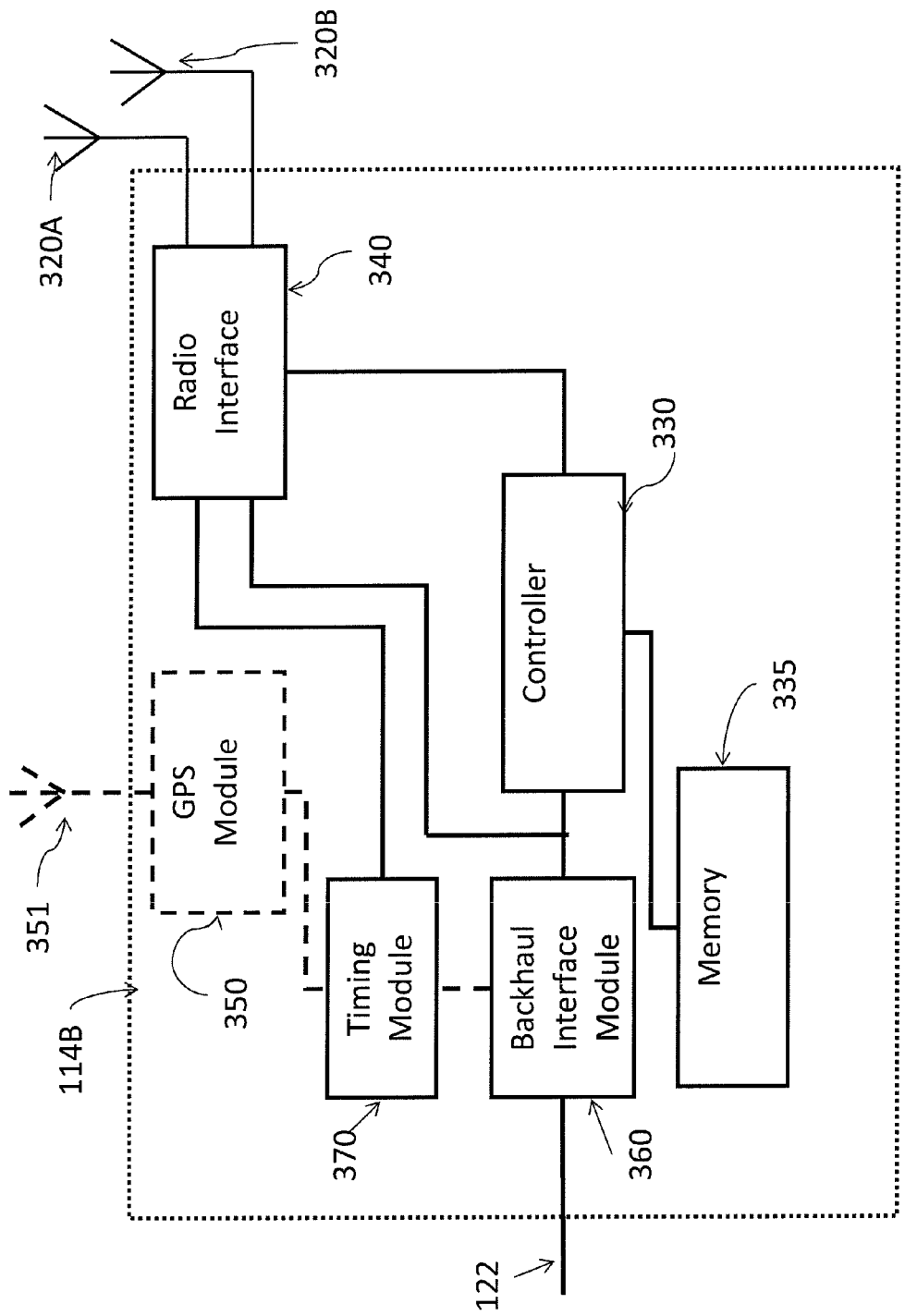
FIG. 3 depicts a block diagram of a Base Station.

FIG. 3 depicts an exemplary BS according to an aspect of the present disclosure. The Base Station 110A includes one or more antennas 320A-B configured to transmit downlink signals (and in a bi-directional system also configured to receive uplink signals). Antenna radiation patterns may be directional or omnidirectional. More than one transmission antenna may be used for the purposes of Transmit Diversity or Multiple Input Multiple Output (MIMO) or other signal or spatial processing techniques. The Base Station also includes a radio interface 340 coupled to the antennas 320A-B; a processor 330 for controlling the base station 110A and for accessing and executing program code stored in memory 335; a Backhaul Interface module 360 that acts as an interface to the incoming backhaul link 122 between the base station 110A and other network elements (e.g. 124); and a synchronisation and timing module 370.

The synchronization and timing module 340 may, depending upon deployment option, derive its timing from the backhaul 122 via the backhaul interface 360 or from an optional Global Positioning System module or similar satellite system module 350 when connected to its associated Antenna 351. The timing module 340 provides a reference timing signal to the Controller 330 and Radio Interface 340. The Outer-Coding function and Convergence Sublayer may be implemented as part of the Controller 330 or within the Radio Interface 340 or as part of a separate module (not shown).

Those skilled in the art will recognise in a practical realisation of Base Station equipment some of these functional elements need not be physically separate and could be combined into a single module.

To assist in clarifying at least one embodiment of the present disclosure, specific terms used in this specification are further defined. The terms are defined with reference to IEEE standard 802.16. One of skill in the art will recognize this is not limiting to the IEEE standard 802.16 but may be applied to other multiple access techniques.

A 'Stream' is defined as a flow of information which in its entirety carries information for a media stream such as a video stream or audio stream or a combination of video, audio and hypertext. A Stream may be composed of several sub-streams; each sub-stream carries packets that are identically modulated and encoded at the same inner and outer code rates. A sub-stream may also contain the information required for extracting the application packets from all the decoded outer-code data blocks (for example packet delineation information) of a particular stream.

An OCTI (Outer-Coding Transmission Interval) is defined as an interval of N (OFDMA) consecutive frames which every N (OFDMA) frames recur. The sequence of OCTIs is specific to an MBS Zone and is specified in terms of the number of frames in each OCTI (length) and the start frame of each OCTI. Each outer coded data block is transmitted within one OCTI.

The OCTINS (OCTI Numbering System) is used for referencing and numbering a subset of symbols in the frames transmitted during one OCTI and the OCTINS Domain is the set of symbols within an OCTI that are referenced by the OCTINS.

According to one aspect of the present disclosure, one way of referencing a particular MAC (Media Access Control) frame is the use an OCTI-MAP message to signal the mapping of outer-coded data blocks. This method is more robust and efficient than for example, the current MBS-MAP message used in IEEE standard 802.16. In the IEEE 802.16 standard, integration of the new message will require limited PHY changes and can co-exist with the current 16e bi-directional data services and MBS services.

Some benefits of the new method include that the OCTI_MAP message does not rely on DL-MAP message or the "daisy-chaining" mechanism, but is rather transmitted at configurable a-priori known locations. Furthermore, the OCTI_MAP message provides the mapping information for an entire outer-coding interval, rather than for one frame at a time, and thereby encodes the mapping information more efficiently. Next, the OCTI_MAP message specifies the MAC PDU delineation, thereby enabling the suppression of the MAC PDU headers. Also, the OCI_MAP message may optionally be re-transmitted one or more times during the outer-coding intervals, and thereby become more robust. Next, the OCTI_MAP message specifies MCS and allocations in a manner that complements the outer-coding in an optimized way. For example, some aspects of the OCTI_MAP, such as the frame numbering system, could be made optional. Finally, the OCTI_MAP message provides support for sub-streams, thereby allowing for unequal protection of the application packets belonging to the same MBS stream.

For each MBS zone, some of the parameters related to the OCTI structure are static in nature. These parameters include but are not limited to the MBS Zone ID, the fixed length of the OCTIs, a reference start frame for one OCTI with subsequent OCTIs occur at an integer multiples of the fixed OCTI length after that frame, the number and locations of the OCTI_MAP messages transmitted during an OCTI, the maximum number of symbols that the OCTI_MAP may occupy and finally, the MCS and the permutation type (PUSC or FUSC) used to encode the OCTI_MAP message.

These parameters may be configured at the user equipment's MIB, providing the interface between the upper layer (NCMS) and the 802.16 entity to configure these parameters. Although MBS Zone IDs may be reused, i.e., two non-adjacent and non-overlapping zones may be identified by the same MBS Zone ID, it is assumed that the MBS Zone IDs are allocated to MBS zones in such a way that within any geographic area of adequate size for which the user equipment may be configured, each MBS zone ID identifies at most one MBS zone.

A reference start frame for one OCTI is specified using an adjusted reference to overcome the problem that BSs within an MBS zone may not have their frame numbering synchronized.

According to one aspect of the present disclosure, an adjusted reference works as follows: Let T be the frame number wrap-around period, e.g., $T=2^j \times 5$, for $0 \leq j \geq 24$ and let $N_b(t)$ denote the frame number transmitted at a given BS b at time t, where t is an integer multiple of 5 ms with reference to GPS time 0 (i.e., midnight of Jan. 6, 1980 GMT). For each BS b transmits (e.g., in the DCD) the number $N_b(0)$, which is the number of the frame that the BS b transmitted at GPS time 0 or at any integer number of frame number wrap-around periods since GPS time 0. At any given two BSs 110A and 110B, where 110A will be referred to as b and 110B will be referred to as b' and frame transmission time t, $(N_b(t)-N_b(0))$mod $2^m = (N_{b'}(t)-N_{b'}(0))$mod $2^m$, for $0 \leq m \geq 24$, i.e., the least m significant bits of $N_b(t)-N_b(0)$ at any time t are identical at all BSs b. This allows for using a number K, where $0 \leq K < 2^m$, to uniquely identify at any BS a frame within an interval of $2^m$ frames. The frame number mod $2^m$ of this frame at BS b is $(K-N_b(0))$mod $2^m$.

The OCTI-MAP message relies on the concept of a Stream ID. It is assumed that an operator allocates Stream IDs is such a way that every (MBS Zone ID, Stream ID) identifies a stream and that the mapping of (MBS Zone IDs, Stream IDs) to streams within a geographic area of adequate size is available at the application layer at the SS. The OCTI MAP message also allows for streams to comprise several sub-streams. The sub-streams are encoded into separate outer-code data blocks. A sub-stream may be a subset of the stream's application packets which requires a different (e.g., a more robust) outer-coding. A sub-stream may also contain the information required for extracting the application packets from all the decoded outer-code data blocks (such as the application packet delineation information) of a particular stream.

According to another aspect of the present disclosure, one way of achieving PER suitable for broadcast or multicast video and audio applications is to add an optional outer-coding scheme to MBS/MBMS data. Use of this outer-coding scheme adds significant time-diversity with the purpose to operate at a higher MCS (employing higher order modulation and/or less powerful coding).

Figure 4:
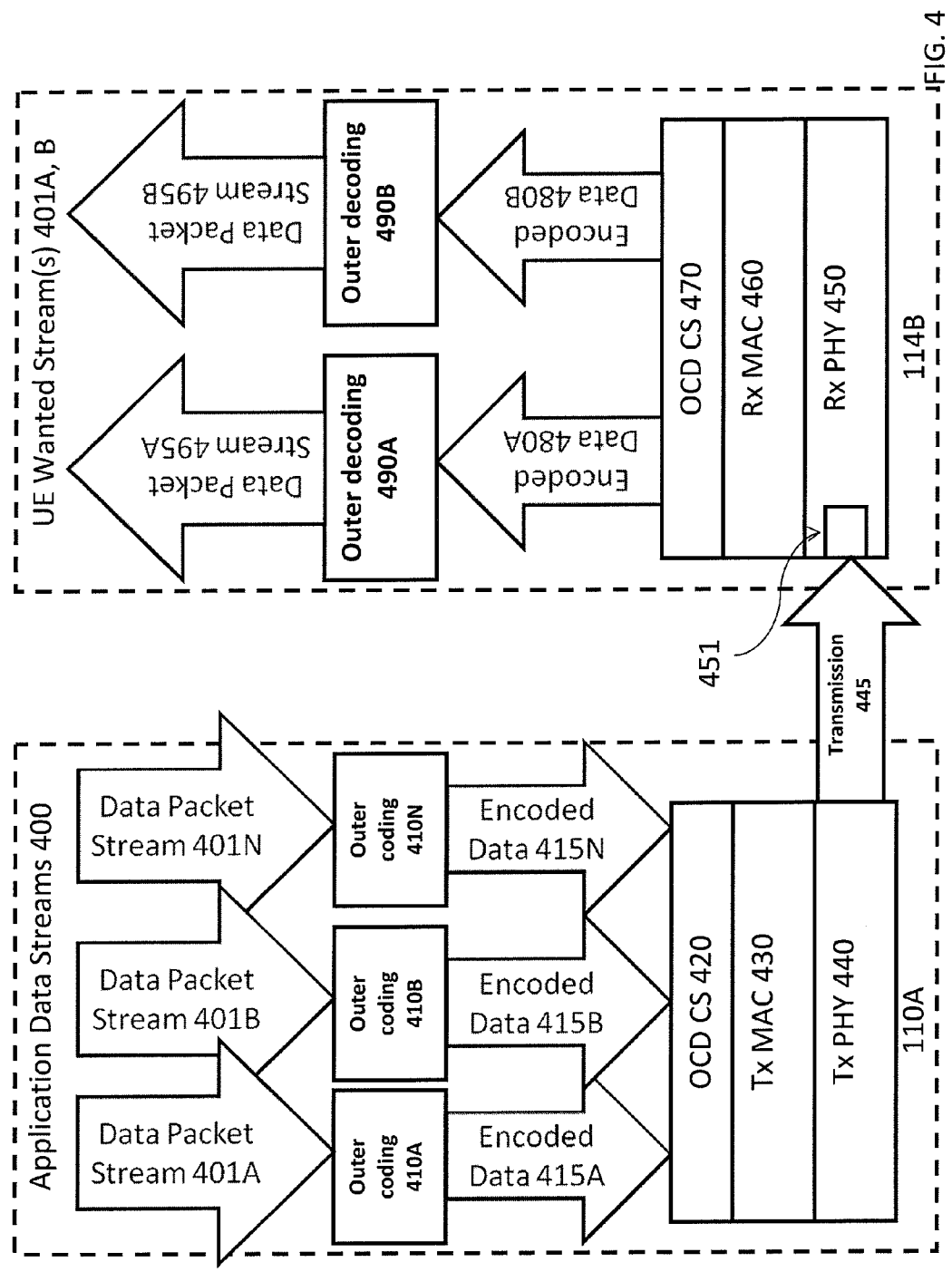
FIG. 4 depicts an overview of the protocol stack from application to physical layer with outer-coding of application data.

FIG. 4 illustrates an embodiment of the outer-coding solution. It comprises processing the Application Data Streams prior to transmission in two steps; outer-coding and interfacing to the MAC layer prior to being wirelessly transmitted and subsequent reception at the UE.

In a first step, within the access network infrastructure (such as within a BS 110A) the incoming aggregate data stream 400 is divided into individual streams. In an alternate embodiment, a network element such as the Network Control Module 124 may also divide the incoming aggregate data stream into individual streams. Each individual incoming Application Data Packet Steam 401A, 401B, . . . 401N is then outer-coded 410, using a code such as a Reed-Solomon code, as appropriate; different codes (410A, 410B, . . . 410N) may be used to encode different streams and within a stream unequal protection may be provided to sub-streams.

In one possible embodiment, where the outer-code is a Reed-Solomon code, each row of the outer code block is a Reed-Solomon (RS) codeword. As is known, RS codewords may be generated on a GF (Galois Field). In an exemplary embodiment, a GF(256) finite field may be used. The GF(256) finite field has the field generator polynomial:

$$p(x)=x^8+x^4+x^3+x^2+1$$

And the code generating polynomial:

$$g(x) = \prod_{i=0}^{2\lceil p/2 \rceil -1} (x+\lambda^i)$$

where $\lambda=2$ and p is the number of parity bytes.

The outer-coding encoding process may be based on a codeword RS(N,K), where RS(N,K) represents a codeword of length N with K data bytes (including a possible RS padding byte). If N is less than 255, the codeword is a shortened Reed-Solomon codeword. Note that the number of parity bytes p which is equal to the codeword length minus the number of data bytes K, (i.e., P=N−K), must always be an even number. However, the last byte may be punctured, that is, it is generated by the encoder, but not transmitted by the BS thus, by definition, not available at the UE decoder. This property may be used to advantage in some embodiments. To generate a shortened Reed-Solomon codeword, the systematic bytes of the codeword shall be prefixed with 255−N 0x00 bytes. The encoder generates a RS(255,255−N+K) codeword of length 255 and drops the leading 255−N 0x00 bytes. The shortened codeword is the resulting N bytes of the codeword which includes the original K systematic bytes and P=N−K parity bytes.

At the BS 110A, the application layer packets are written into the Reed-Solomon code such that packets are interleaved across multiple Reed-Solomon codewords. They are preceded by a control block that aids in packet delineation without error propagation. RS (Reed Solomon) padding bytes are added to the last few bytes of the data section of the table if necessary to fill the data section of the table. These are assigned the value 0x00 and are not transmitted over the air interface.

In an embodiment the data from the Reed-Solomon code block is transmitted according to a method to ensure that the Reed-Solomon codewords are interleaved in time. In some embodiments, for example the context of IEEE802.16, column shuffling may be used to improve frequency diversity. In embodiments employing a process of 'shuffling' data this is be done in such as way as it occurs prior to the insertion of standard MAC and PHY signaling such that the standards' defined positions and formats are retained. To achieve this, the data in a column of the Reed-Solomon table must be shuffled prior to delivery of the SDU (Service Data Unit) to the MAC layer for insertion of GMH, calculation of CRC-16, and transmission. The presence or absence of column shuffling is indicated within a transmitted signaling message.

The additional outer-coding, such as the RS code described, enables the system to operate at lower SINR (Signal to Interference plus Noise Ratio); SINR that would otherwise result in unacceptable PER (Packet Error Rate) at the UE.

In a second step a CS (Convergence Sublayer), referred to as the OCD-CS (Outer Coded Data Convergence Sublayer) 420, is used to provide an interface to the MAC layer 430. The BS OCD-CS supports the following: accepting the outer-coded data packets; classifying the received data packets and mapping them to the appropriate MCID (Multicast Connection ID) or equivalent; passing the data packets and associated signalling to the MAC CPS (Common Part Sublayer) or equivalent.

The MAC layer passes the information to the PHY (Physical) Layer 440 where the resulting data is transmitted wirelessly 445. Note that to enable backwards compatibility and for the possibility that outer-coding is not required for some streams MBS packets that have not been outer-coded may also be transmitted by the BS 110A and received by UE 114B.

At the UE 114B the receiver 451 need not receive all streams; it only need attempt to receive the selected application data stream or streams (for example FIG. 4 depicts the UE recovering Stream 401 A and 401 B). In a corresponding manner to the BS transmission, a CS is used to interface the UE MAC 460 with the Outer-decoding function 490A, B (which undoes the coding applied to the transmitted stream). The UE OCD-CS 470 transparently passes the received data packets and their Stream IDs (stream indications) to the outer-coding decoding function, the output of which comprise the wanted application data stream or streams. In this example 495A is the recovered version of 401A, and 495B is the recovered version of 401B; assuming error free decoding the input streams and output streams will be identical In an embodiment, where RS coding is used as the outer-code by the transmitter, all User Equipment designed to receive the outer-code MBS mode described herein support RS decoding on blocks of length up to 255 (in each row) with different possible combinations of systematic data and parity bytes having up to 64 parity bytes. This allows for support of different Reed Solomon combinations where the total number of data bytes plus the number of parity bytes (including possible puncturing) is less than or equal to 255.

If the process (previously described) of column shuffling was used by the BS prior to transmission the UE unshuffles the data using an appropriate de-shuffling process. This is performed according to the shuffling previously applied by the BS, prior to passing the Application Data to the higher layers of the protocol stack.

Optionally, in a Single Frequency Network (SFN), the UE 114 may combine streams from more than one BS (110A, 110B) that are time aligned and contain the same content (as indicated by for example, Stream ID, MBS Zone ID and Frame Number such as can be determined from the adjusted frame reference). The combination of streams transmitted from different BS in the same MBS Zone 110A, B would have the beneficial effect of reducing PER or enabling operation at lower SINR than otherwise possible.

Figure 5:
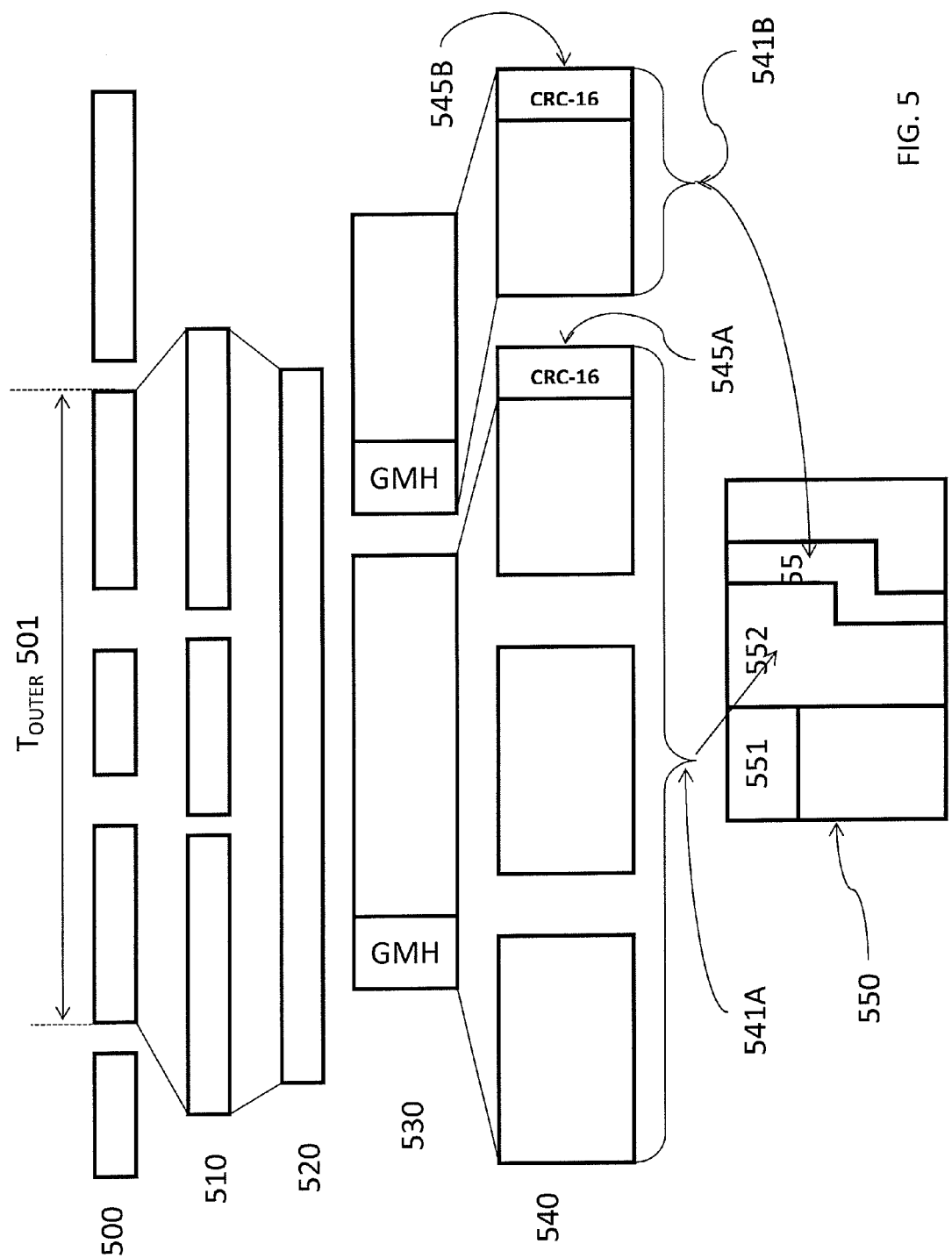
FIG. 5 depicts an overview of the frame structure from application to physical layer with outer-coding of application packet data.

An embodiment using outer-coding solution is further depicted in FIG. 5 and described by way of example with reference to 802.16. Similar procedures could be applied to other standards.

A stream of Application Packets 500 in an OCTI ('outer-coding time interval') 501 (time duration "TOUTER") are outer-coded 510 and formatted to form an outer-coded MAC Packet Service Data Unit (SDU) 520. The typical duration of the OCTI is on the order of hundreds of milliseconds; recognising the trade-off between processing gain and delay in a practical system a range of one hundred ms up to two seconds is envisaged.

In order not to unnecessarily weaken the outer-code, the application data is mapped to the MAC and PHY such that data and signaling that either does not benefit from outer-coding or is not necessary for retrieving the outer-coded data is not subject to outer-coding. Such data that is necessary for retrieving the outer-code should be very robustly coded (in the standard MAC/PHY). Further standard MAC and/or PHY layer data may be added prior to transmission. For example, in one embodiment a Generic MAC Header (GMH) 535 is shown inserted to each of a stream of Protocol Data Units (PDU) 530; next a Cyclic Redundancy Check (CRC) 545A, 545B of typically 16 or 32 bits is calculated and added to the frame to for the FEC Blocks 540.

The stream of FEC Blocks 540 is mapped into the appropriate positions in the MBS region of the PHY layer prior to transmission 550. For the purposes of illustration, the MBS mapping information is in region 551, the processed Application Data group of FEC Packets 541A is mapped to position 552 and FEC Packet 541 B is mapped to position 553. Other mappings are possible. The effect of the above method is that data that has been outer-coded during the outer-coding interval is combined with any other coding dependent information and passed to the MAC/PHY such that information (as illustrated by the insertion of GMH and CRC in the description above) that is not outer-coded is in deterministic locations and of deterministic size.

Since outer-coding can recover from missing the reception of an entire MAC PDU fragment of the outer-coder packet, unlike conventional fragmentation of SDUs into MAC PDUs, it is important to know which bytes were lost rather than merely that a particular fragment was lost. Moreover, this information can be sent as robustly as either the MBS_MAP or the outer-coded data. According to one aspect of the present disclosure, the fragmentation of outer-coder packets (MAC SDUs for the outer-coding function) into MAC PDUs does not necessarily use the fragmentation or packing sub-headers, but instead uses a fragmentation byte number (FBN) in the MBS_OUTER_CODED_DATA_IE TLV in the MBS_MAP to indicate which byte of the outer-coder packet maps to the first byte of an allocation for the MCID. Additionally, to avoid dependence on the length field in the GMH to determine the number of pad bytes in the last sub-burst allocated for and outer-coder packet, at the end of the outer-coder interval the number of sub-burst padding bytes is included in the MBS_OUTER_CODED_DATA_IE TLV. This allows the MAC layer to use this information to strip the padding bytes before delivery to higher layers.

The outer-coded data is transmitted along with a message specifying the outer-coded MBS allocations. The message includes: the length of the OCTIs (outer coded transmission interval); a reference start frame for one OCTI using the previously described method using an adjusted reference, subsequent OCTIs occurring at integer multiples of the OCTI length; the number and location of messages relevant to receiving and decoding the outer coded data during an OCTI; the MCS (Modulation and Coding Scheme) and any other information used to encode the message or necessary to locate and decode the outer-coded application data.

As previously noted the OCTI mapping message specifies the allocations for each stream using the OCTI Numbering System (OCTINS). The OCTINS is used to index a subset of all symbols in all Downlink sub-frames that are transmitted during one OCTI. This subset of symbols is referred to as the OCTINS domain. In an embodiment the BS schedules all the streams that belong to the MBS zone within the subset of symbols that constitute the OCTINS domain.

Finally the data is mapped onto the lower physical layer 550 prior to transmission from the BS 110A over the wireless downlink 116A.

Further improvements in the throughput may be achieved by fixing the transmission interval for the outer-coded data blocks. This allows for efficient and robust signaling of the mapping of the outer-coded data to allocations in the OFDMA frames, which, combined with the outer coding, results in an increase in throughput compared with known MBS implementations.

Figure 6:
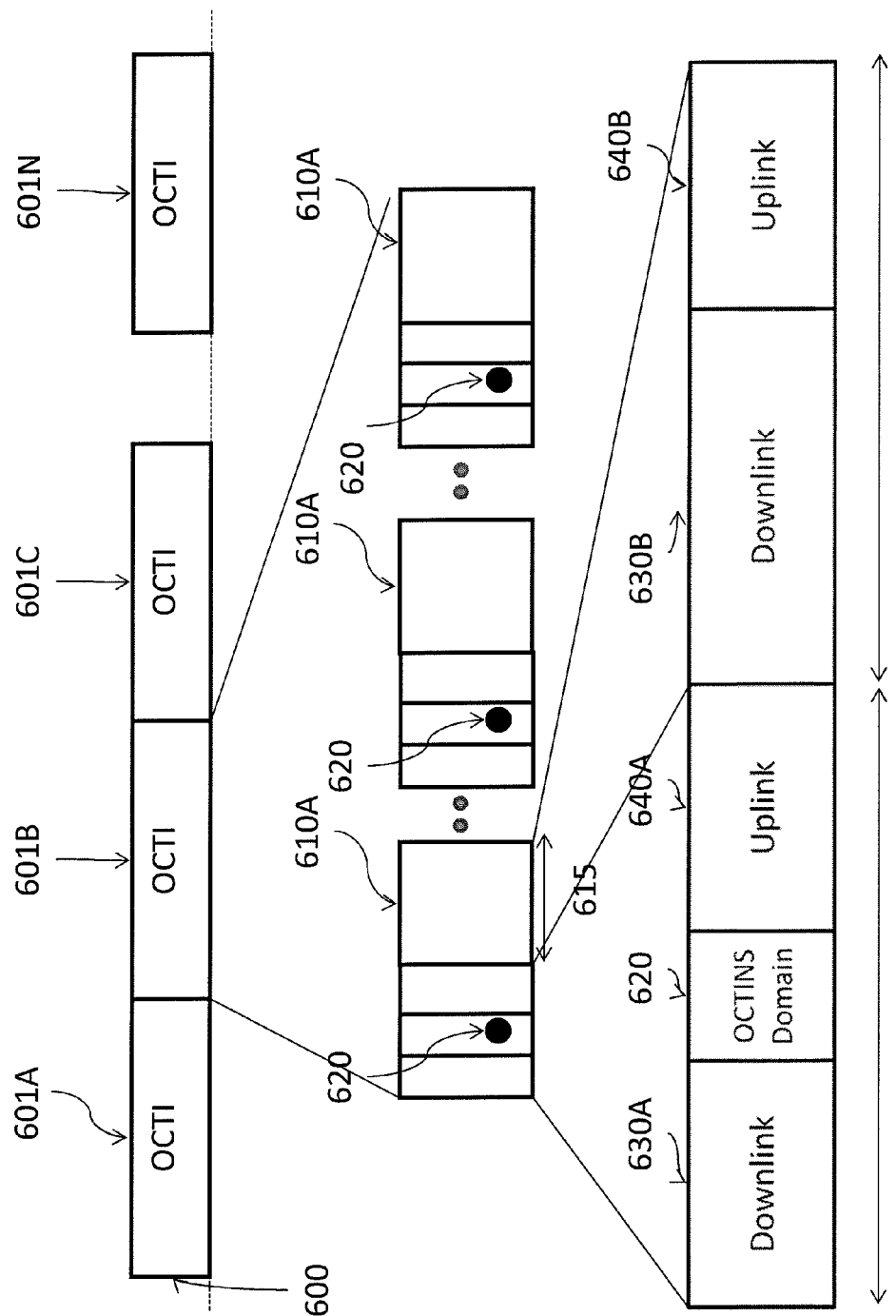
FIG. 6 depicts the Outer Coding Transmission Interval mapping message as it could be applied to a wireless air interface using a Time Division Duplex mode of operation.

FIG. 6 illustrates elements of the OCTI mapping message transmitted by the base station to enable the UEs to locate and decode the desired outer-coded application data. The OCTI mapping message is shown in the context of an OFDMA TDD system; where base station downlink transmission and uplink reception occur alternately within a physical layer frame. The principle can be equally applied to FDD systems or Downlink only systems.

A sequence of OCTI 600 comprises individual OCTI 601 A, B, . . . n each with a fixed number of OFDMA Frames which are MBS Zone specific, contain outer-coded blocks from multiple streams and the allocations of which are specified by the OCTI Mapping message transmitted during the previous OCTI.

Each OCTI 601A comprises one or more OFDMA Frames 615 some of which contain the OCTINS domain data 620. The OCTINS domain is made up of an integer number of OFDMA symbols and contains the outer-coded data of the streams allocated in the frame. An OFDMA frame 615 comprising downlink and uplink portions is illustrated.

Since the OCTINS domain occupies part of the downlink allocation this results in the downlink 630A (which may be used for purposes other than outer-coded MBS including the support of conventional MBS, the downlink of two-way services, unicast transmission, etc.) being shorter than the downlink 630B where no OCTINS domain is present.

The OCTINS domain may be specified by a vector, V, whose length N is less than or equal to the number of frames of the OCTI and each element is a non-negative integer less than or equal to the total number of symbols in the Downlink sub-frame. The OCTINS vector V, signals the number of symbols in each frame that are contained in the OCTINS domain. If B is the number of frames in the OCTI and k is the number of a frame within the OCTI, thus 0≤k<B, then the OCTINS domain contains the V(k mod N) last symbols of the kth subframe. The symbols in the OCTINS domain are numbered in increasing order starting with 0. The BS signals the OCTINS vector in the OCTI mapping message, which enables the UE to determine which frame k and which symbol s in frame k a given number m references and, thereby, interpret the mapping information in that message.

It follows from the above description that the number of symbols that are referenced by the OCTINS in DL sub-frames 0, N, 2N, . . . is V(0), the number of symbols that are referenced by the OCTINS in DL sub-frames 1, N+1, 2N+1, . . . is V(1), etc. Given an OCTINS domain symbol number m, the UE can identify which symbol s in which DL sub-frame k (where the first symbol of a DL sub-frame is numbered 0) this number references. The following steps may be used to calculate k and s given m.

Let $a=\lfloor m/S \rfloor$ and r=m mod S, where $S=\Sigma_{i=0}^{N-1}V(i)$

Let j≥0 be the last integer such that $\Sigma_{i=0}^{j}V(i)>r$

Then, k=aN+j and $s=|DL|-\Sigma_{i=0}^{j}V(i)+r$, where |DL| is the number of symbols in the Downlink Subframe.

Symbols in the OCTINS domain that are not allocated to any stream may be used for other allocations, such as allocations for unicast transport.

The uplink time durations 640A and 640B are unaffected by the presence or absence of the OCTINS domain.

The OTCI sequence is MBS zone specific; each outer-coded block of each stream that is transmitted in an MBS zone is transmitted over the air interface within one OCTI. As noted before, the OCTI period in a practical embodiment is likely to be on the order of hundreds of milliseconds; typically 100 ms to 2 seconds. The OCTINS is a system for numbering a subset of the symbols in one OCTI.

In some embodiments one or more of the following features may be introduced.

A message is transmitted which specifies the mapping of outer-coded data blocks transmitted in the next outer-coding interval (rather than one frame at a time); this message may be transmitted one or more times to improve robustness; the message allows for sub-streams thereby allowing unequal protection to be applied to packets belonging to the same MBS stream.

Resources leftover after all the MBS streams within the MBS zone are allocated may be allocated for other purposes.

The BS periodically transmits a field to indicate the burst profile including the MCS (Modulation and Coding Scheme) in use. The insertion of the adjusted (frame) reference number will be described in the context of IEEE802.16 and assuming the use of GPS timing. In IEEE802.16 this periodic field is referred to as the DCD (Downlink Channel Descriptor). A TLV (Type Length Value) descriptor with a Type field of 1 byte and a Value Field of 3 bytes (24 bits) representing an integer number N set to the frame number of the frame transmitted at time to, where, as previously described, to is expressed with reference to GPS time and is such that t0 mod(24×Tf)=0 ms, where Tf is the frame duration, which is typically 5 ms and a Length field of 1 byte is contained within the DCD message. Other standards use different terminology; other embodiments may use different timing methods, reference clock sources including IEEE1588 and reference times; field sizes, frame duration and other parameters may differ.

Furthermore, in an embodiment, the MCS (Modulation and Coding Scheme) allocations in the PHY may be specified in a manner to optimally complement the outer-coding scheme.

Where certain parameters in the system are fixed these may be configured at the BS and UE thus obviating the need to transmit them over the backhaul (to BS) or air interface (to UE).

The subject matter described herein may be embodied in systems, apparatus, methods, and/or articles depending on the desired configuration. Base station 110A (or one or more components therein) can be implemented using one or more of the following: a processor executing program code, an application-specific integrated circuit (ASIC), a digital signal processor (DSP), an embedded processor, a field programmable gate array (FPGA), and/or combinations thereof. User Equipment 114B (or one or more components therein) can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine readable medium that receives machine instructions as a machine-readable signal. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method for use in a base station of a wireless communications system, the method comprising:
   receiving data packets from a network;
   dividing the data packets into one or more data streams;
   performing outer encoding on the one or more data streams to generate one or more outer-encoded data blocks, wherein each of the one or more outer-encoded data blocks is associated with an outer-coding transmission interval, wherein the outer-coding transmission interval comprises a plurality of consecutive data packets;
   mapping each of the one or more outer-encoded data blocks to an outer-coding transmission interval vector based on the associated outer-coding transmission interval, wherein the outer-coding transmission interval vector identifies each of the one or more outer-encoded data blocks within a downlink portion of a frame;
   combining the one or more outer-encoded data blocks with non-encoded information;
   transmitting the outer-coding transmission interval vector to a user equipment (UE) via an air interface of the wireless communications system to enable the UE to identify each of the one or more outer-encoded data blocks; and
   transmitting the combined one or more outer-encoded data blocks and non-encoded information to the UE via the air interface.

2. The method of claim 1, wherein the data streams comprise of application data content.

3. The method of claim 1, further comprising:
   sending the one or more outer-encoded data blocks to a medium access control (MAC) layer in protocol data units (PDUs) that map to physical layer (PHY) forward error-correction code (FEC) blocks, such that the non-encoded information is in deterministic locations and of deterministic size.

4. The method of claim 1, wherein the wireless communications system supports Orthogonal Frequency Division Multiplexing/Orthogonal Frequency Division Multiple Access (OFDM/OFDMA).

5. The method of claim 1, wherein the outer encoding is performed using Reed Solomon encoding.

6. The method of claim 5, wherein the one or more Reed Solomon encoded data packets are interleaved in time.

7. The method of claim 1, wherein each outer-coding transmission interval is associated with a multicast broadcast service (MBS) zone.

8. The method of claim 7, wherein the outer-coding transmission interval vector is associated with an outer-coding transmission interval map message that provides mapping information for each outer-coding transmission interval, wherein the mapping information identifies content in the outer-encoded data blocks.

9. The method of claim 8, wherein the outer-coding transmission interval map message is re-transmitted one or more times during an outer-coding transmission interval at predetermined locations.

10. The method of claim 9, wherein the outer-coding transmission interval map message is transmitted in a medium access control (MAC) layer protocol data unit (PDU) that contains a cyclic redundancy check (CRC).

11. The method of claim 9, wherein the outer-coding transmission interval map message is transmitted one or more times during a preceding outer-coding transmission interval.

12. The method of claim 1, wherein each of the one or more data streams may comprise one or more sub-streams.

13. The method of claim 12, wherein the one or more sub-streams are encoded into separate outer-encoded data blocks.

14. The method of claim 11, wherein the outer-coding transmission interval map message specifies an allocation for each stream using an outer-coding transmission interval numbering system to index a subset of all symbols in all downlink sub-frames that are transmitted during an outer-coding transmission interval.

15. A method for use in a user equipment (UE), the method comprising:
   receiving one or more data blocks from a base station, wherein the one or more data blocks include one or more outer-encoded data blocks and non-encoded information, wherein each of the one or more outer-encoded data blocks are mapped to an outer-coding transmission interval vector based on an associated outer-coding transmission interval, wherein the outer-coding transmission interval vector identifies each of the one or more outer-encoded data blocks within a downlink portion of a frame;
   receiving the outer-coding transmission interval vector;
   identifying each of the one or more outer-encoded data blocks based on the outer-coding transmission interval vector;
   performing outer decoding on the one or more outer-encoded data blocks; and
   extracting application packets from the one or more outer-decoded data blocks.

16. A user equipment, comprising:
   a receiver configured to receive one or more data blocks from a base station, wherein the one or more data blocks include one or more outer-encoded data blocks and non-encoded information, wherein each of the one or more outer-encoded data blocks are mapped to an outer-coding transmission interval vector based on an associated outer-coding transmission interval, wherein the outer-coding transmission interval vector identifies each of the one or more outer-encoded data blocks within a downlink portion of a frame;
   the receiver further configured to receive the outer-coding transmission interval vector;
   a processor configured to identify each of the one or more outer-encoded data blocks based on the outer-coding transmission interval vector;

the processor further configured to perform outer decoding on the one or more outer-encoded data blocks; and the processor further configured to extract application packets from the one or more outer-decoded data blocks.

17. An apparatus, comprising:

a receiver configured to receive data packets from a network;

a processor configured to divide the data packets into one or more data streams;

the processor further configured to perform outer encoding on the one or more data streams to generate one or more outer-encoded data blocks, wherein each of the one or more outer-encoded data blocks is associated with an outer-coding transmission interval, wherein the outer-coding transmission interval comprises a plurality of consecutive data packets;

the processor further configured to map the one or more outer-encoded data blocks to an outer-coding transmission interval vector based on the associated outer-coding transmission interval, wherein the outer-coding transmission interval vector identifies each of the one or more outer-encoded data blocks within a downlink portion of a frame;

the processor further configured to combine the one or more outer-encoded data blocks with non-encoded information;

a transmitter configured to transmit the outer-coding transmission interval vector to a user equipment (UE) via an air interface in a wireless communications system to enable the UE to identify each of the one or more outer-encoded data blocks; and the transmitter configured to transmit the combined one or more outer-encoded data blocks and non-encoded information to the UE via the air interface.

18. The apparatus of claim 17 further comprising:

the processor further configured to determine a schedule including a modulation and coding scheme (MCS) for simultaneous transmission of the combined one or more outer-encoded data blocks and non-encoded information.

* * * * *